US012097699B2

(12) United States Patent
Yoshikawa et al.

(10) Patent No.: US 12,097,699 B2
(45) Date of Patent: Sep. 24, 2024

(54) LIQUID DISCHARGE HEAD AND LIQUID DISCHARGE APPARATUS

(71) Applicant: CANON KABUSHIKI KAISHA, Tokyo (JP)

(72) Inventors: Shimpei Yoshikawa, Kanagawa (JP); Kyosuke Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/329,338

(22) Filed: Jun. 5, 2023

(65) Prior Publication Data

US 2023/0391080 A1 Dec. 7, 2023

(30) Foreign Application Priority Data

Jun. 6, 2022 (JP) ................................. 2022-091393

(51) Int. Cl.
*B41J 2/14* (2006.01)
*B41J 2/16* (2006.01)

(52) U.S. Cl.
CPC ......... *B41J 2/14048* (2013.01); *B41J 2/1408* (2013.01); *B41J 2/1623* (2013.01); *B41J 2202/15* (2013.01)

(58) Field of Classification Search
CPC .. B41J 2/14048; B41J 2/1408; B41J 2/14032; B41J 2/14145; B41J 2202/15; B41J 2202/07; B41J 2/1404
See application file for complete search history.

(56) References Cited

U.S. PATENT DOCUMENTS

| | | | | |
|---|---|---|---|---|
| 7,370,940 | B2 * | 5/2008 | Hashimoto | B41J 2/1631 347/56 |
| 2009/0201343 | A1 * | 8/2009 | Muraoka | B41J 2/1404 347/65 |
| 2019/0152229 | A1 * | 5/2019 | Nakagawa | B41J 2/17553 |

FOREIGN PATENT DOCUMENTS

| | | | |
|---|---|---|---|
| JP | 2002166553 | A | 6/2002 |
| JP | 2006240150 | A | 9/2006 |
| JP | 2021194841 | A | 12/2021 |

* cited by examiner

*Primary Examiner* — Kristal Feggins
(74) *Attorney, Agent, or Firm* — Canon U.S.A., Inc. IP Division

(57) ABSTRACT

A liquid discharge head includes a channel member and a recording element substrate. The channel member includes a discharge port configured to discharge liquid and at least one channel configured to supply the liquid to the discharge port. The recording element substrate includes a supply path and an energy generating element. The supply path connects to the at least one channel with a connection and is configured to supply the liquid to the at least one channel. The energy generating element is configured to discharge the liquid from the discharge port. The channel member further includes, at positions of the channel member facing the connection, a plurality of spaces, the spaces being formed by covering part of recesses of the channel member with a covering portion, the spaces each including an opening communicating with the at least one channel.

10 Claims, 11 Drawing Sheets

LIQUID DISCHARGE HEAD AND LIQUID DISCHARGE APPARATUS

FIELD OF THE DISCLOSURE

The present disclosure relates to liquid discharge heads and liquid discharge apparatuses.

DESCRIPTION OF THE RELATED ART

Ink jet printers, which are liquid discharge apparatuses, include a liquid discharge head that discharges liquid, such as ink. The liquid discharge head includes an energy generating element that generates discharge energy for discharging liquid. Droplets discharged from the liquid discharge head land on a recording medium to perform recording.

In ink jet printers, liquid vibration causes meniscuses in the discharge ports to vibrate. In particular, liquid discharge heads with multiple nozzles densely arrayed and high liquid flow rate per unit time tend to produce such meniscus vibrations. For example, when liquid discharge from a plurality of discharge ports is stopped at once, the inertial force of the liquid to move forward increases. The inertial force pushes out the liquid in the nozzle, making the meniscuses protrude from the discharge ports. The liquid tank, which is a liquid supply source, is generally configured to maintain negative pressure to prevent the liquid from dripping off the supply ports. For this reason, the liquid supplied from the liquid tank is acted upon by a force to draw it back upstream (toward the liquid tank). This causes the liquid whose meniscus protrudes in the discharge ports to move back to the opposite side, as described above.

Thus, after the discharge is stopped, meniscus vibration in which the meniscuses protrude forward and retract backward is induced in the discharge ports. Such vibration increases as the ink flow rate per unit time increases. If the next discharge is performed, with the meniscuses protruding forward or retracting backward, small droplets splash in the former state, and the discharge speed and volume decrease in the latter state, both of which can cause a print failure, such as erratic discharge.

To address the above issue, Japanese Patent Laid-Open No. 2006-240150 discloses a technique for attenuating the meniscus vibration in the discharge ports using buffer chambers for containing bubbles in a surface of the liquid discharge head remote from the discharge ports in the common liquid chamber and an intermediate point of the ink channel.

Japanese Patent Laid-Open No. 2002-166553 discloses a technique for attenuating the meniscus vibration using a dummy channel with no discharge port in the outermost nozzle row of the liquid discharge head, where bubbles are made to remain, so that the dummy channel serves as a buffer.

The liquid discharge head disclosed in Japanese Patent Laid-Open No. 2006-240150 may be unable to produce a sufficient meniscus vibration reducing effect because the distance from the discharge ports to the buffer chamber is large. In contrast, the liquid discharge head disclosed in Japanese Patent Laid-Open No. 2002-166553 has a sufficient meniscus vibration reducing effect in recording at a normal flow rate because the distance from the dummy channel serving as a buffer to the discharge ports is small. However, in recording at a high ink flow rate per unit time, the bubbles in the dummy channel can flow together with the ink to reach the discharge ports, decreasing the ink discharge performance.

SUMMARY

The present disclosure provides a liquid discharge head in which meniscus vibration in the discharge ports can be stably reduced or eliminated even in recording at a high ink flow rate per unit time.

In an aspect of the present disclosure, a liquid discharge head includes a channel member including a discharge port configured to discharge liquid and at least one channel configured to supply the liquid to the discharge port; and a recording element substrate including a supply path connecting to the at least one channel with a connection, the supply path being configured to supply the liquid to the at least one channel, and an energy generating element configured to discharge the liquid from the discharge port, wherein the channel member further includes, at positions of the channel member facing the connection, a plurality of spaces, the spaces being formed by covering part of recesses of the channel member with a covering portion, the spaces each including an opening communicating with the at least one channel.

Further features of the present disclosure will become apparent from the following description of embodiments with reference to the attached drawings.

DESCRIPTION OF THE EMBODIMENTS

Embodiments of the present disclosure will be described hereinbelow. The following embodiments describe liquid discharge heads that discharge ink, or liquid, and ink jet recording apparatuses, which are liquid discharge apparatuses.

Outline of Recording Apparatus and Liquid Discharge Head

Figure 1:
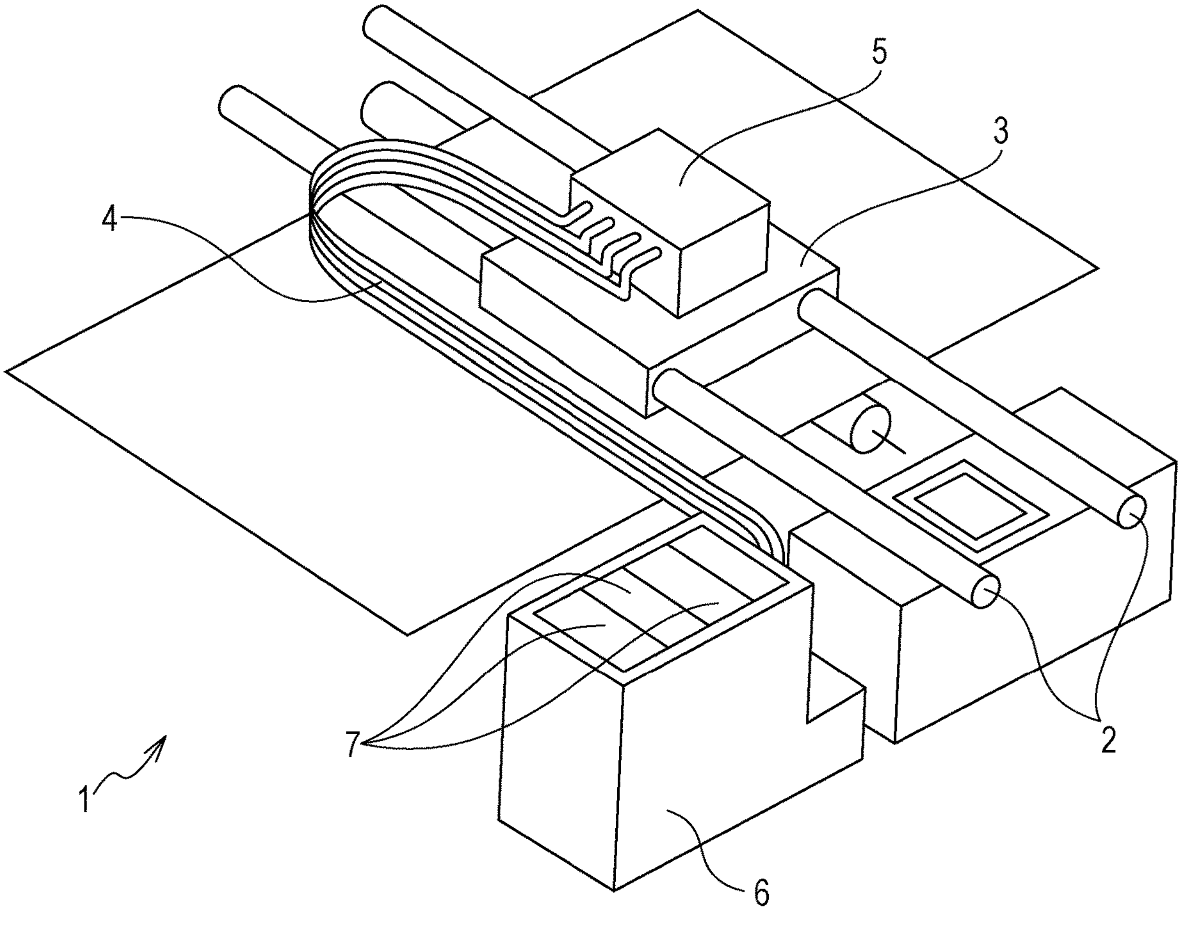
FIG. 1 is a schematic diagram illustrating an example of a recording apparatus of the present disclosure.

FIG. 1 is a schematic diagram illustrating a recording apparatus according to an embodiment of the present disclosure. The recording apparatus 1, which is a liquid discharge apparatus, includes guide rails 2, on which a carriage 3 is disposed so as to scan a recording medium. The carriage 3 is loaded with a liquid discharge head 5 for discharging liquid for printing (recording). The recording apparatus according to an embodiment of the present disclosure may be a recording apparatus configured to discharge liquid from a liquid discharge head while moving a recording medium without moving the carriage.

The liquid discharge head 5 is supplied with ink from an ink supply source 6 through ink supply tubes 4. The liquid discharge head 5 includes many nozzles, through which ink is discharged when energy generating elements, such as heaters or piezoelectric elements, are driven. The ink supply source 6 includes ink storages 7 independent for the individual kinds of ink, here, four colors of ink, black, yellow, magenta, and cyan. Each ink storage 7 includes a connection port connecting to the outside and is configured to be directly supplied with ink in an external ink bottle or the like. The ink supply tubes 4 are independent for the individual kinds of ink and connect the ink supply source 6 (the ink storages 7) to the liquid discharge head 5.

The ink supply source 6 may be a replaceable ink tank or an ink cartridge. The ink supply source 6 may be disposed on the carriage 3 or integrated with the liquid discharge head 5.

Figure 2:
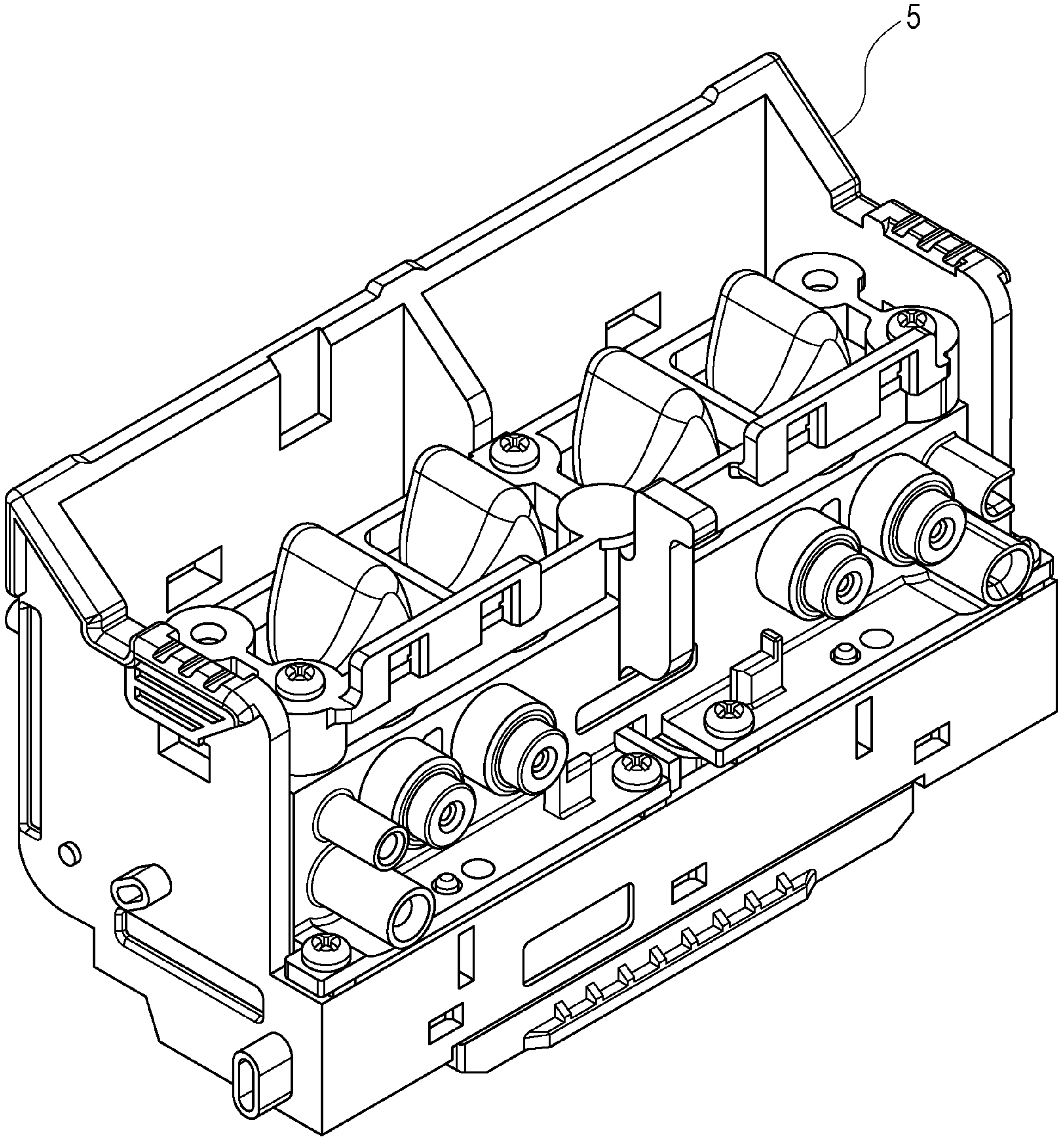
FIG. 2 is a perspective view of an example of the liquid discharge head of the present disclosure.
Figure 3:
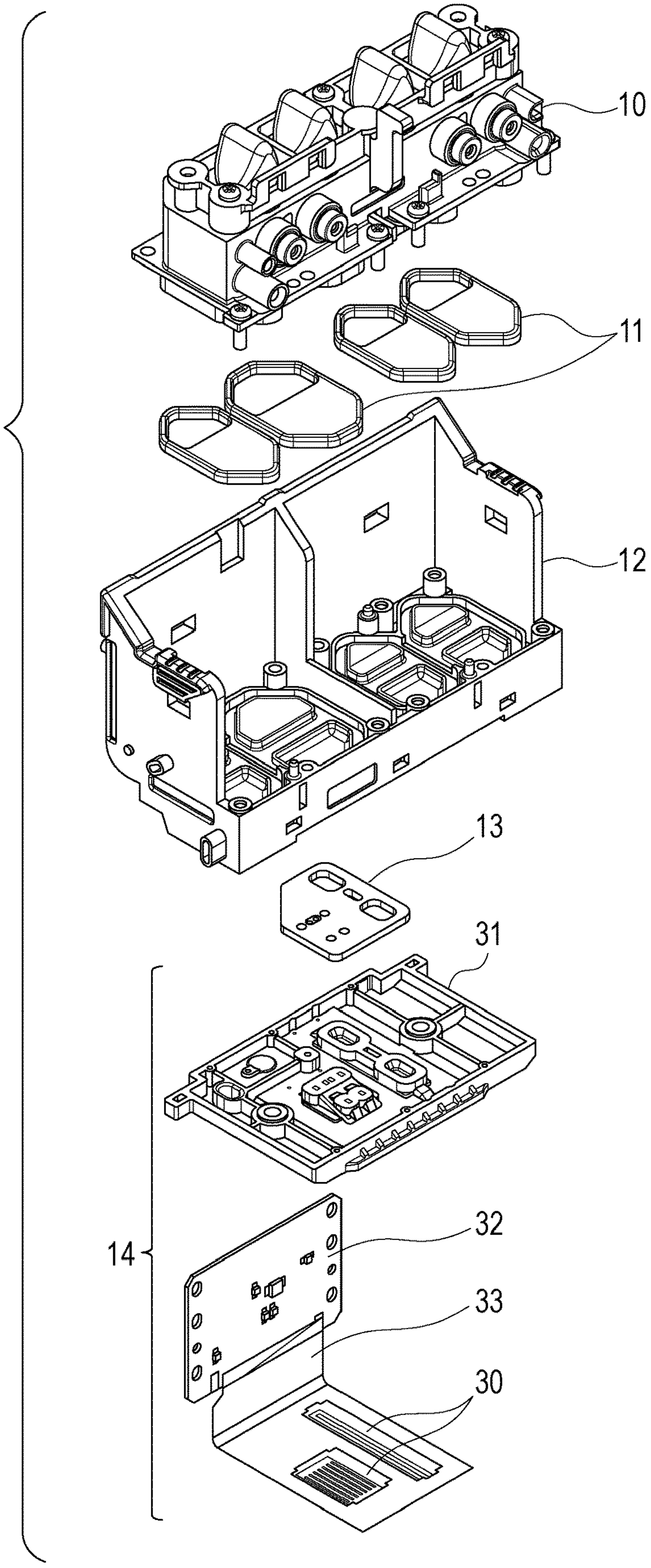
FIG. 3 is an exploded diagram illustrating an example of the liquid discharge head of the present disclosure.

FIG. 2 is a schematic diagram of the liquid discharge head 5. FIG. 3 is an exploded perspective view of the liquid discharge head 5. As shown in FIG. 3, the liquid discharge head 5 includes a subtank unit 10, a head body 12, and a recording element unit 14. The head body 12 and the subtank unit 10 are screwed together, with first elastic members 11 held therebetween, so as to be fixed and sealed. The head body 12 and the recording element unit 14 are screwed together, with a second elastic member 13 held therebetween, so as to be fixed and sealed and connected to ink channels. The recording element unit 14 includes a recording element 30, a supporting member 31, an electrical substrate 32, and an electric wiring board 33.

Figure 4A:
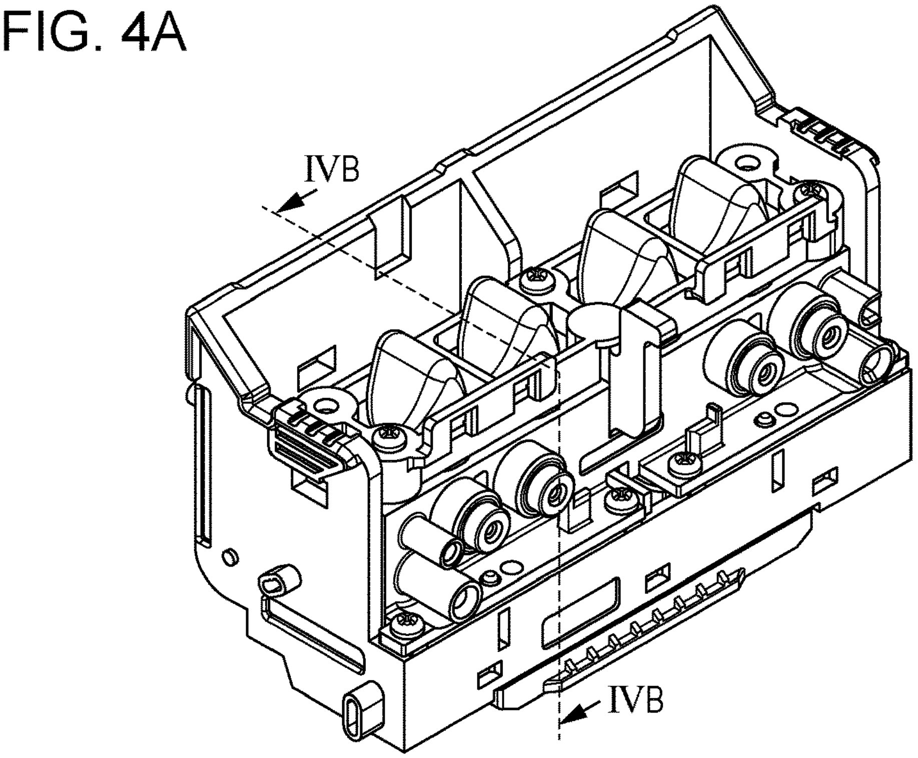
FIG. 4A is a perspective view of an example of the inner structure of the liquid discharge head of the present disclosure.
Figure 4B:
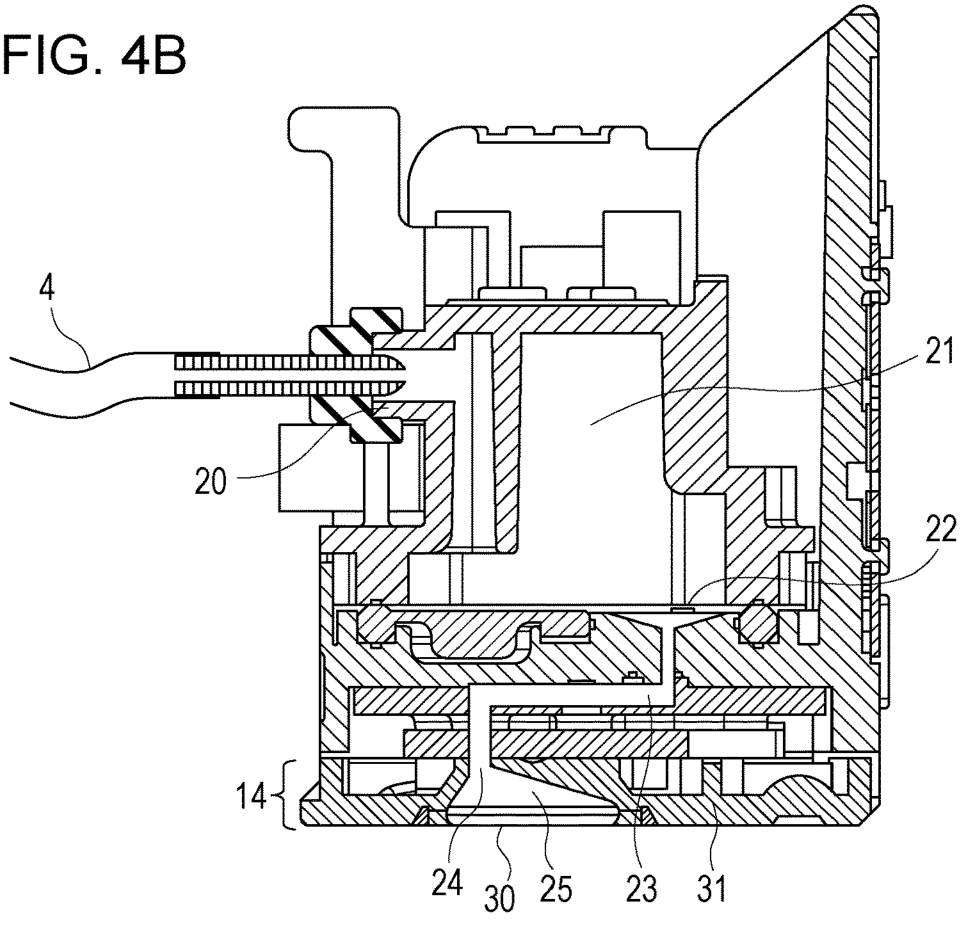
FIG. 4B is a cross-sectional view of an example of the inner structure of the liquid discharge head of the present disclosure.

Next, an ink supply path will be described. FIGS. 4A and 4B are diagrams illustrating an example of the inner structure of the liquid discharge head 5 of an embodiment of the present disclosure. FIG. 4B is a cross-sectional view of the liquid discharge head 5 taken along line IVB-IVB in FIG. 4A. The liquid discharge head 5 is supplied with ink into ink chambers 21 in the subtank unit 10 through joints 20 from the ink supply source 6 (see FIG. 1) through the ink supply tubes 4. The ink supplied to each ink chamber 21 passes through a filter 22 of the head body 12 and is supplied to the recording element unit 14 through a first inner channel 23. A supply port 24 and a second inner channel 25 of the recording element unit 14 are formed of a supporting member 31. In this embodiment, the second inner channel 25 expands toward the recording element 30.

Figure 5:
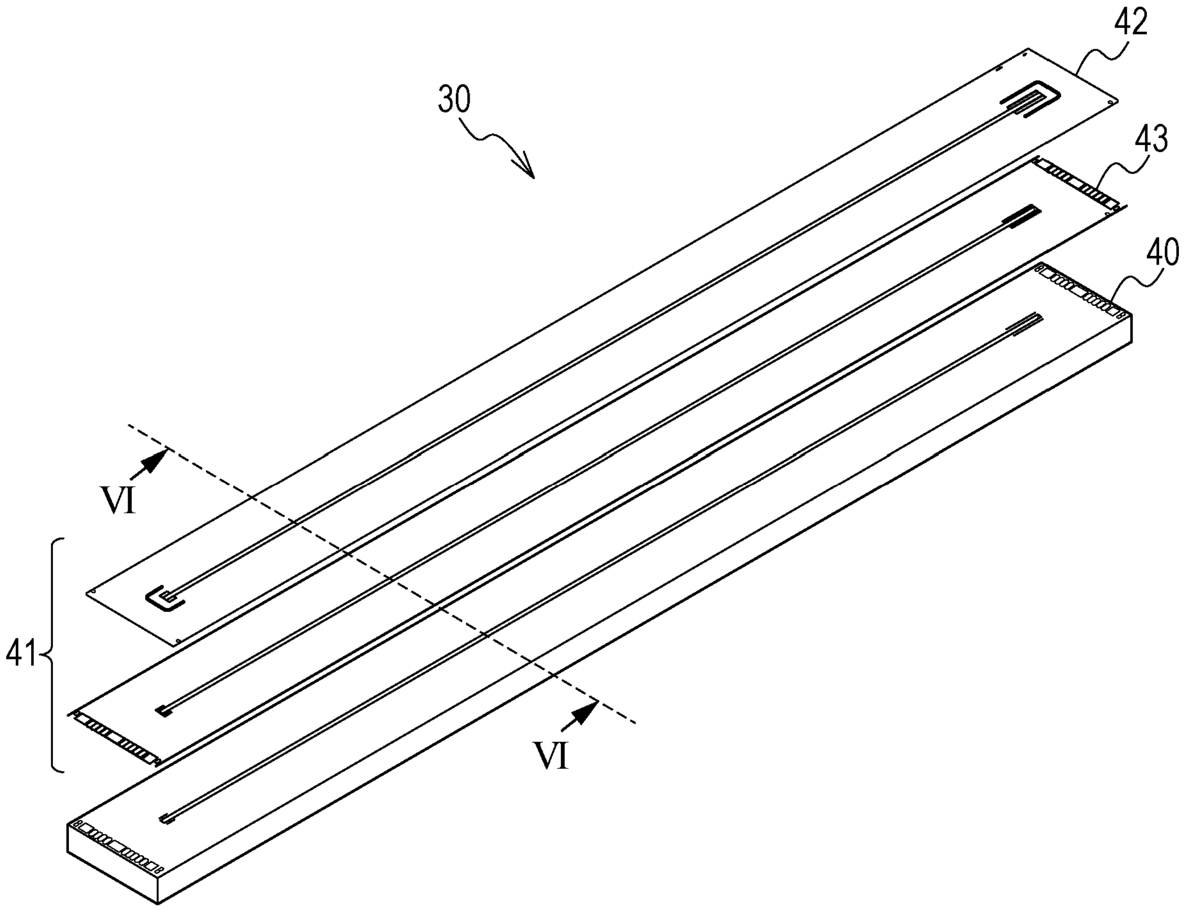
FIG. 5 is an exploded diagram illustrating an example of the recording element of the present disclosure.

Next, the structure of the recording element 30 will be described. FIG. 5 is an exploded diagram illustrating the structure of the recording element 30. The recording element 30 includes a recording element substrate 40 made of silicon and a channel member 41 formed on the recording element substrate 40 with a photolithographic technique.

The channel member 41 includes a channel formed member 42 and an adhesion enhancing member 43 that enhances the adhesion between the channel formed member 42 and the recording element substrate 40.

A process for manufacturing the recording element 30 will be described hereinbelow. However, this is illustrative only, and the present disclosure is not limited to this process. First, the layer of the adhesion enhancing member 43 is formed on the recording element substrate 40. Thereafter, the layer is patterned with an exposure device and a photomask to form the adhesion enhancing member 43 in which openings of a desired shape are formed. An example of the forming method is a method of patterning the adhesion enhancing member 43 made of a photosensitive material into a desired shape using an exposure device and a photomask. This method cures only a portion irradiated with the light from the exposure device, with a portion shaded by the photomask left uncured. This allows a desired shape to be given by washing away the uncured portion after the light irradiation. An example of a material for the adhesion enhancing member includes a material that is cured only in areas not irradiated with light.

Next, a channel mold (not shown) is formed on the adhesion enhancing member 43. The channel formed member 42 is formed on the channel mold, and discharge ports 52 are formed using an exposure device and a photomask. Thereafter, a supply path 50 is formed in the recording element substrate 40. Next, the channel mold is removed with an agent or the like to form the channel member 41.

First Embodiment

A first embodiment of the present disclosure will be described hereinbelow.

Figure 6:
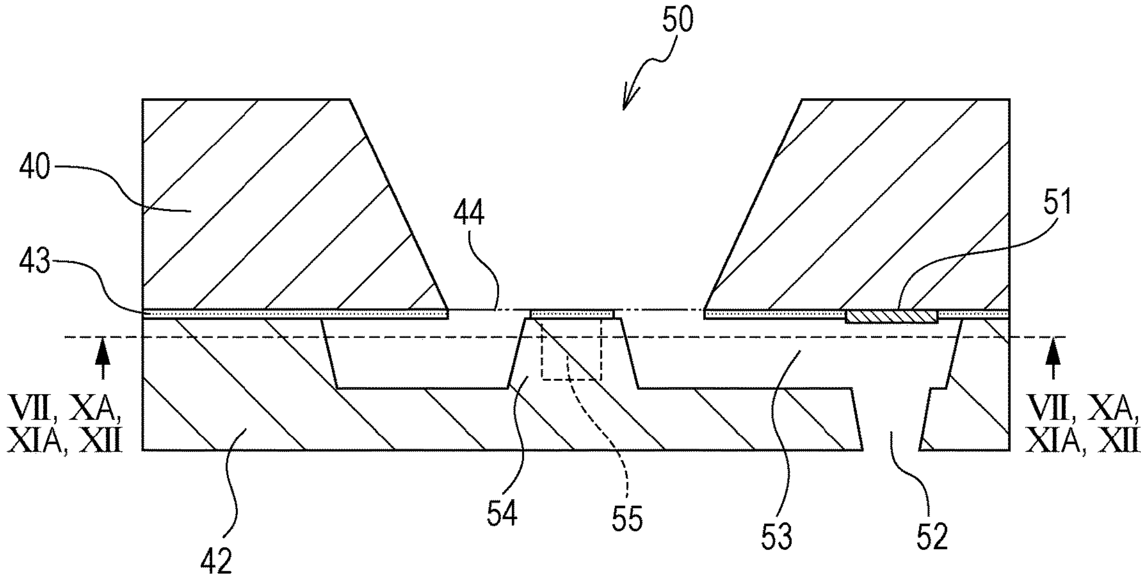
FIG. 6 is a cross-sectional view of an example of the recording element of the present disclosure.
Figure 7:
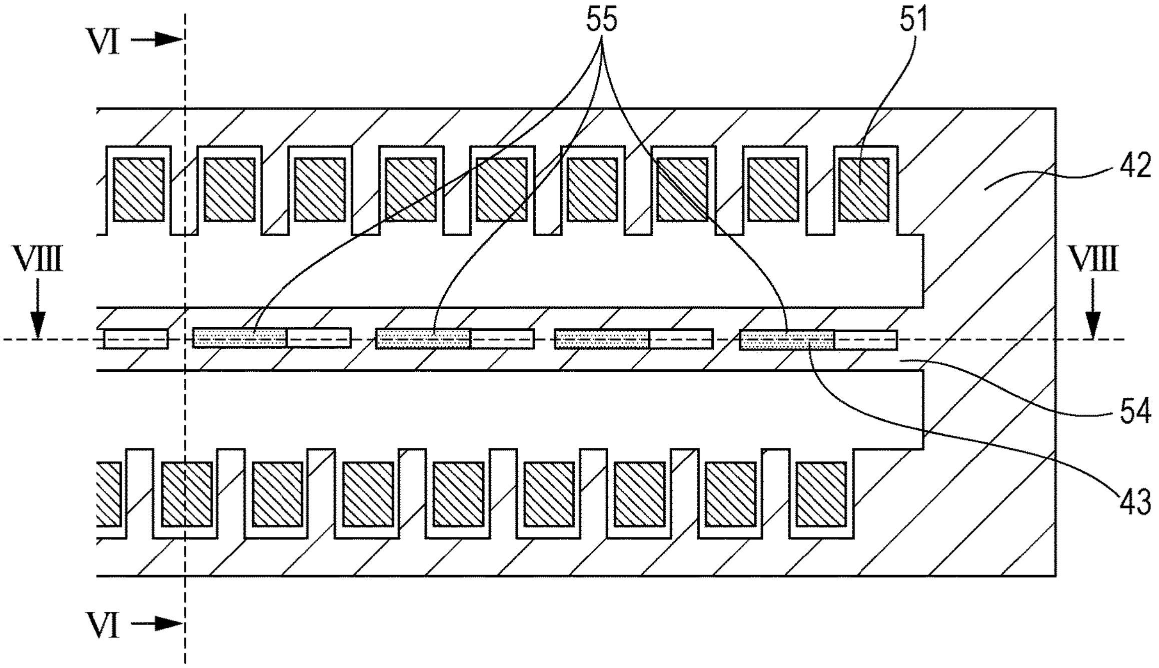
FIG. 7 is a cross-sectional view of an example of the recording element of the present disclosure.

FIG. 6 is a cross-sectional view of the recording element 30 of the first embodiment taken along line VI-VI in FIG. 5 and line VI-VI in FIG. 7. In the following description, the depth refers to the length in the liquid discharge direction. The recording element substrate 40 includes the supply path 50 and a plurality of energy generating elements 51. The energy generating elements 51 in this embodiment are electrothermal conversion elements but may be other pressure generating units, such as piezoelectric elements. The channel formed member 42 includes a plurality of discharge ports 52 and channels 53 corresponding to the individual discharge ports 52. The positions of the discharge ports 52 correspond to the positions of the energy generating elements 51. In this embodiment, the multiple energy generating elements 51 are arrayed in a staggered arrangement at a density of 600 dpi on one side and 1,200 dpi on both sides. The ink is supplied from the supply path 50 to the channels 53 and is discharged to the outside through the discharge ports 52 by the driving of the energy generating elements 51.

The channel formed member 42 further includes a rib 54 at a position on the same side as the discharge ports 52 and facing a connection 44 between the supply path 50 and the channels 53 of the recording element substrate 40. The rib 54 extends in the longitudinal direction of the supply path 50. The connection 44 is indicated by the dotted lines in FIG. 6. In this embodiment, the rib 54 is 60 μm in width and 16 μm in depth. The area indicated by the dotted line in the rib 54 is a space 55, described later.

Figure 8:
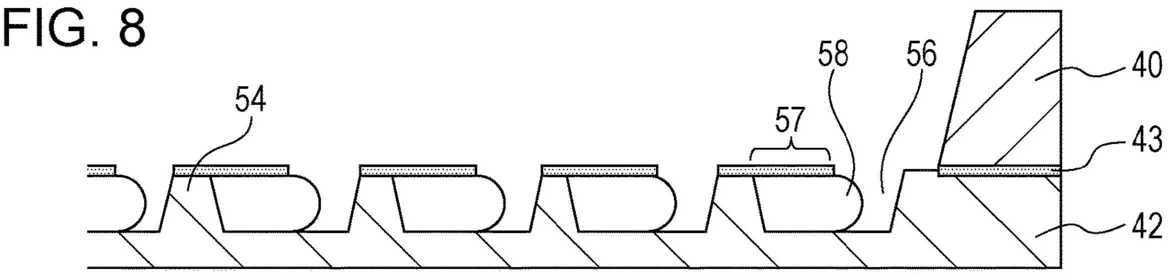
FIG. 8 is a cross-sectional view of an example of the recording element of the present disclosure.

FIG. 7 is a cross-sectional view of the recording element 30 taken along line VII-VII in FIG. 6. FIG. 8 is a cross-sectional view of the recording element 30 taken along line VIII-VIII in FIG. 7. Of the adhesion enhancing member 43, only portions disposed on the rib 54 are illustrated. The rib 54 extending in the longitudinal direction of the supply path 50 includes a plurality of the spaces 55. The spaces 55 are each formed by covering part of a recess of the rib 54 of the recording element substrate 40 with a covering portion 57 of the adhesion enhancing member 43 and each include an opening 56 communicating with the channel 53. The spaces 55 extend in a planar direction parallel to the recording element substrate 40, that is, a planar direction perpendicular to the liquid discharge direction. Even when ink is supplied to the liquid discharge head 5, air, or a bubble 58, stays in the space 55 to exhibit the function of attenuating the meniscus vibration in the discharge port 52 (hereinafter also referred to as "buffer function"). Since the configuration of an embodiment of the present disclosure has the buffer function in the vicinity of the discharge port 52, a more efficient function is expected than that of a known configuration. The present disclosure allows the spaces 55 serving as buffers to be formed only with the existing component and manufacturing process without using another component.

In this embodiment, the spaces 55 are arranged at regular intervals every four discharge ports 52 in a row in the longitudinal direction of the channel member 41. Each space 55 is 15 μm in width, 75 μm in length in the longitudinal direction. The opening 56 is 30 μm in length in the longitudinal direction. The covering portion 57 is 45 μm in length in the longitudinal direction. The length of the opening 56 in the longitudinal direction may be about twice the depth of the space 55 in the liquid discharge direction. This is for the purpose of preventing the channel mold from remaining by assuredly removing the channel mold with an agent. The channel mold, if remaining in the channel member 41, can be expanded by the heat during a curing process after the channel member 41 is formed, causing a manufacturing failure, such as cracking in the channel member 41.

In the configuration of an embodiment of the present disclosure, the spaces 55 are located at positions corresponding to the connection between the supply path 50 and the channels 53. These positions deviate from ink flow path from the supply path 50 to the channels 53. For this reason, even when ink is filled into the liquid discharge head 5 or when a recovery operation to suck ink from the discharge ports 52 is performed to recover from a print failure, the bubbles 58 are kept in the spaces 55. The bubbles 58 act as buffers that absorbs liquid vibration in discharging the liquid, preventing a decrease in print quality even if meniscus vibration occurs.

Figure 9A:
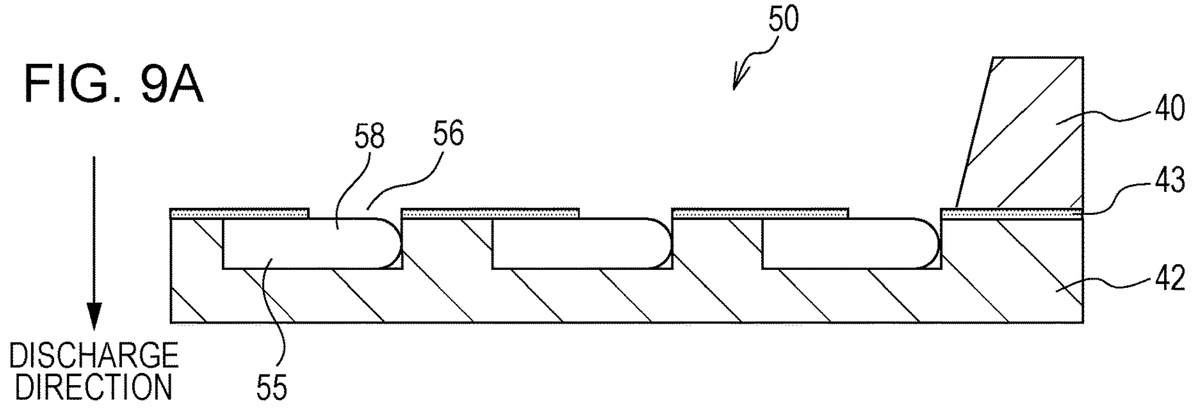
FIG. 9A is a diagram illustrating the behavior of bubbles in a recording element of the present disclosure.
Figure 9B:
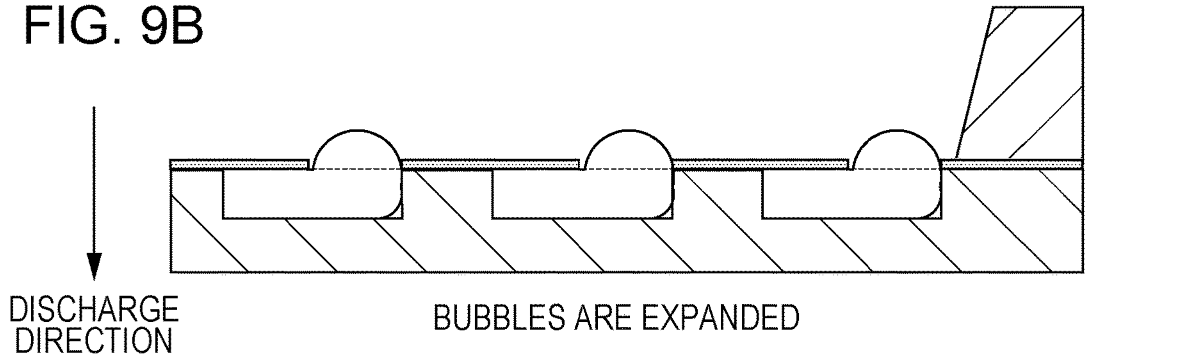
FIG. 9B is a diagram illustrating the behavior of the bubbles in the recording element of the present disclosure.
Figure 9C:
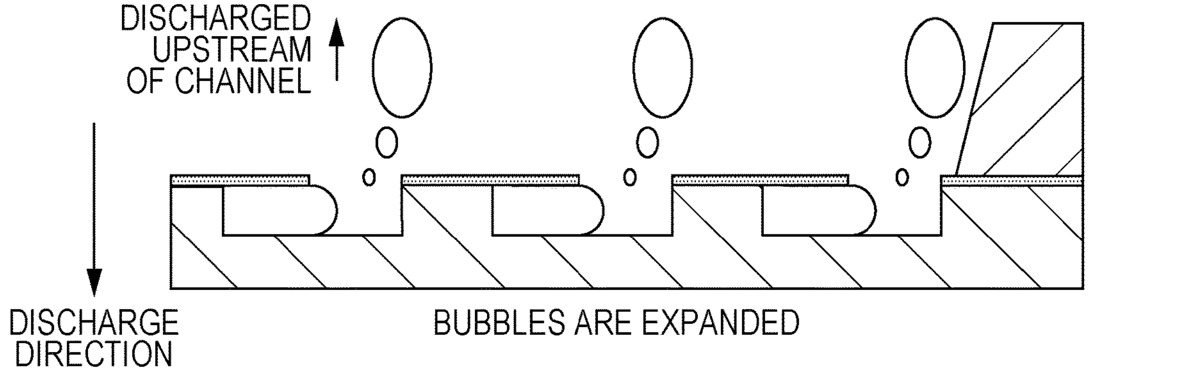
FIG. 9C is a diagram illustrating the behavior of the bubbles in the recording element of the present disclosure.

FIGS. 9A to 9C illustrate the behavior of the bubbles 58 in the spaces 55. In the spaces 55, the openings 56 are open in the direction opposite to the liquid discharge direction, and the supply path 50 is connected to above the spaces 55. Because of this, when bubbles 58 grow up owing to temperature changes (FIG. 9B), the air discharged from the openings 56 are discharged upstream of the channel (FIG. 9C). This configuration eliminates the risk of the bubbles 58 flowing toward the discharge ports 52 in printing to cause a print failure.

In this embodiment illustrated in FIG. 7, one space 55 is provided every four discharge ports 52, allowing all the discharge ports 52 to have the buffer function equally. The interval between the spaces 55 may be decreased. This configuration decreases the distance between each discharge port 52 and the buffer (the opening 56) but decreases the volume of the bubble 58 in each space 55, thereby decreasing the buffer effect in the space 55. The structure of the space 55 may be such that the opening 56 is at the center of the space 55. However, this structure makes the bubble 58 likely to be released, and bubbles with a large volume are likely to absorb vibration. For this reason, the covering portions 57 may be each provided on one side of each space 55, as shown in FIG. 8.

Figure 10A:
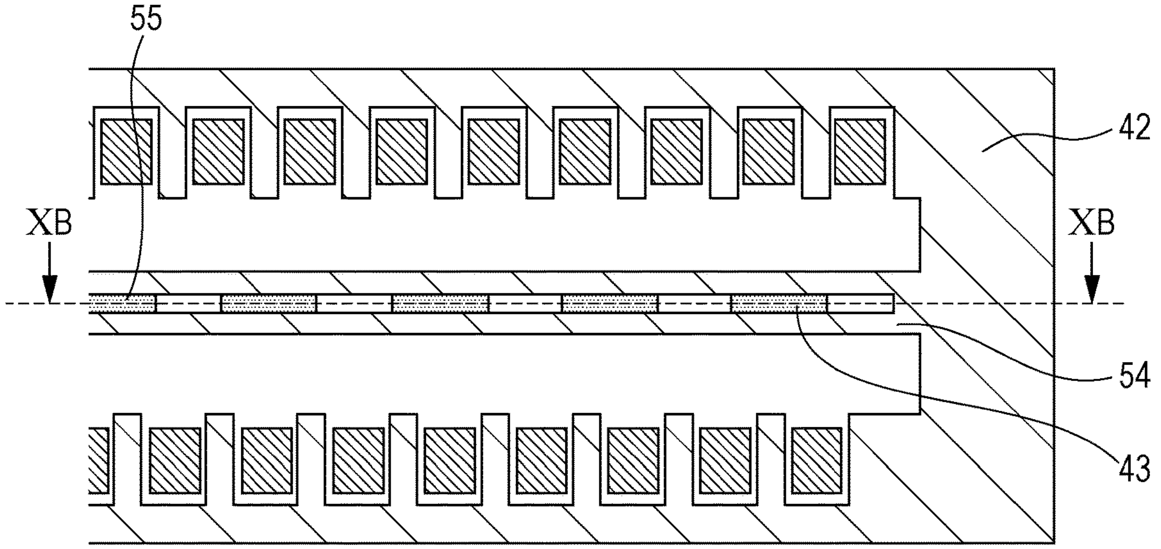
FIG. 10A is a cross-sectional view of an example of a recording element of a comparative example.
Figure 10B:
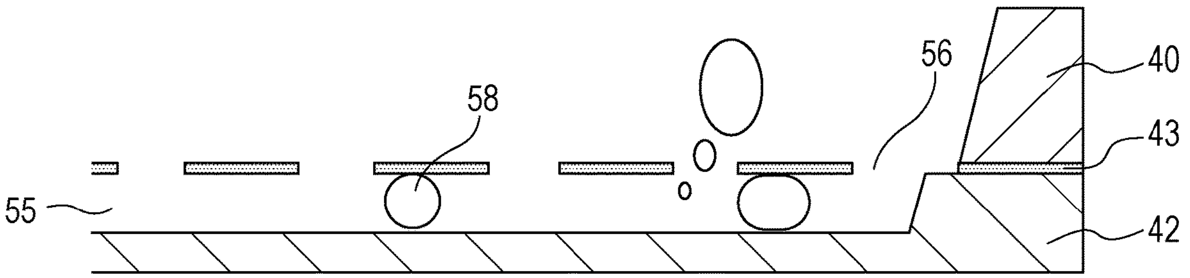
FIG. 10B is a cross-sectional view of an example of the recording element of the comparative example.

FIGS. 10A and 10B illustrate cross-sectional views of a recording element 30 of a comparative example in which one space 55 includes multiple openings 56. FIG. 10A corresponds to the cross-sectional view of the recording element 30 taken along line XA-XA in FIG. 6. FIG. 10B is a cross-sectional view of the recording element 30 taken along line XB-XB in FIG. 10A.

FIG. 10A corresponds to FIG. 7. FIG. 10B corresponds to FIG. 8. FIG. 10A illustrates, of the adhesion enhancing member 43, only portions disposed on the rib 54. As shown in FIGS. 10A and 10B, even with the structure in which the space 55 includes the multiple openings 56, the bubbles 58 between the adhesion enhancing member 43 (the covering portions 57) and the channel formed member 42 still function as buffers. However, the presence of the multiple openings 56 decreases the bubble holding performance which can allow the release of the bubbles 58, thus removing the buffer function. In contrast, an embodiment of the present disclosure includes only one opening 56 in each space 55, thereby providing a constant buffer function.

Second Embodiment

Description of points in common with the first embodiment will be omitted.

Figure 11A:
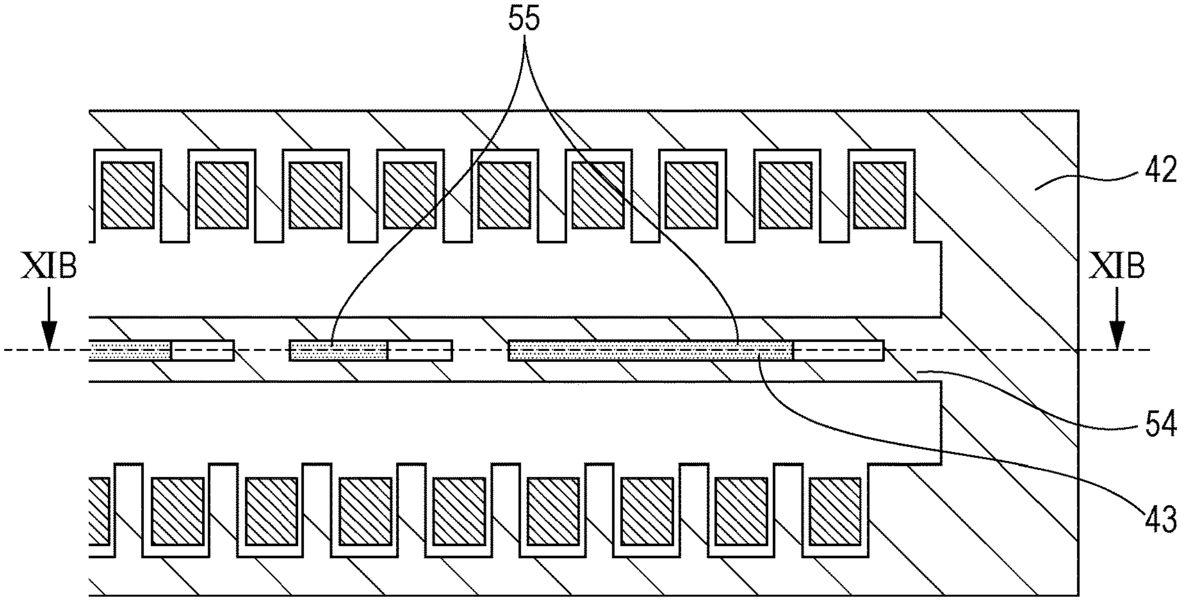
FIG. 11A is a cross-sectional view of a recording element according to a second embodiment of the present disclosure.
Figure 11B:
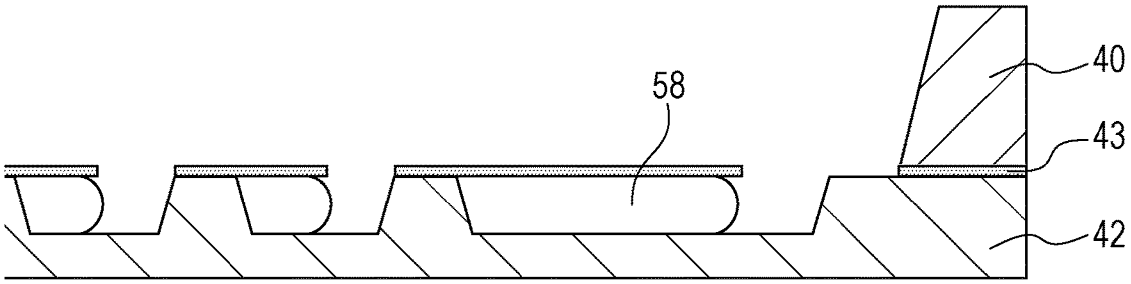
FIG. 11B is a cross-sectional view of the recording element according to the second embodiment of the present disclosure.

FIGS. 11A and 11B are cross-sectional views of a recording element 30 according to a second embodiment. FIG. 11A corresponds to the cross-sectional view of the recording element 30 taken along line XIA-XIA in FIG. 6. FIG. 11B is a cross-sectional view of the recording element 30 taken along line XIB-XIB in FIG. 11A. FIG. 11A illustrates, of the adhesion enhancing member 43, only portions disposed on the rib 54. As shown in FIG. 4B, the second inner channel 25 of the recording element unit 14 expands from the supply port 24 toward the recording element 30. In this case, the more distant the discharge port 52 in the recording element 30 is from the supply port 24, the more pronounced the temporary ink supply shortage at the start of printing. To solve the problem, in this embodiment, shown in FIG. 11A, the spaces 55 at the ends remote from the ink supply port 24 have a longer covering portion 57 than the other. This allows the paces 55 at the ends to hold a larger bubble 58, and a high buffer effect can be expected even at the discharge port 52 located away from the supply port 24. On the other hand, some discharge port 52 are further away from the opening 56, and the buffer function can be obtained only in the vicinity of the opening 56.

Third Embodiment

Figure 12:
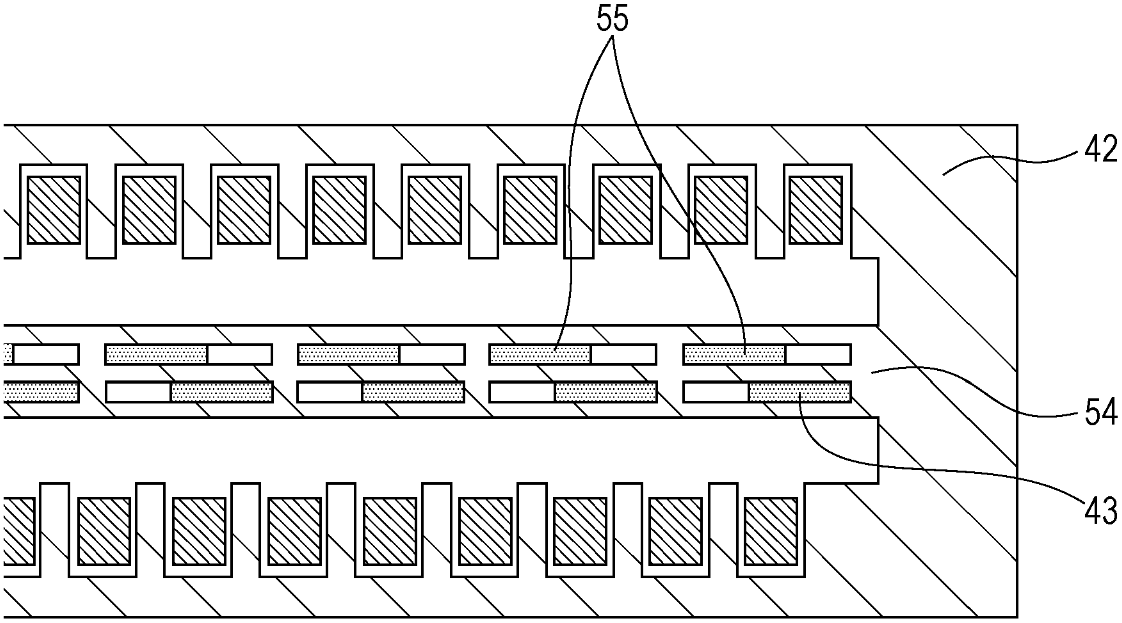
FIG. 12 is a cross-sectional view of a recording element according to a third embodiment of the present disclosure.

FIG. 12 is a cross-sectional view of a recording element 30 according to a third embodiment. FIG. 12 corresponds to the cross-sectional view of the recording element 30 taken along line XII-XII in FIG. 6. FIG. 12 illustrates, of the adhesion enhancing member 43, only portions disposed on the rib 54. The spaces 55 may be arranged in two or more rows in the longitudinal direction of the channel member 41. FIG. 12 illustrates an example in which the rib 54 is increased in thickness, and the spaces 55 are arranged in two or more rows in the longitudinal direction. This increases the cross-sectional area and the volume of each bubble 58, providing a higher buffer effect. On the other hand, the increase in the thickness of the rib 54 narrows the ink flow path from the supply path 50 to the channels 53, resulting in the risk of interfering the supply.

Fourth Embodiment

Figure 13A:
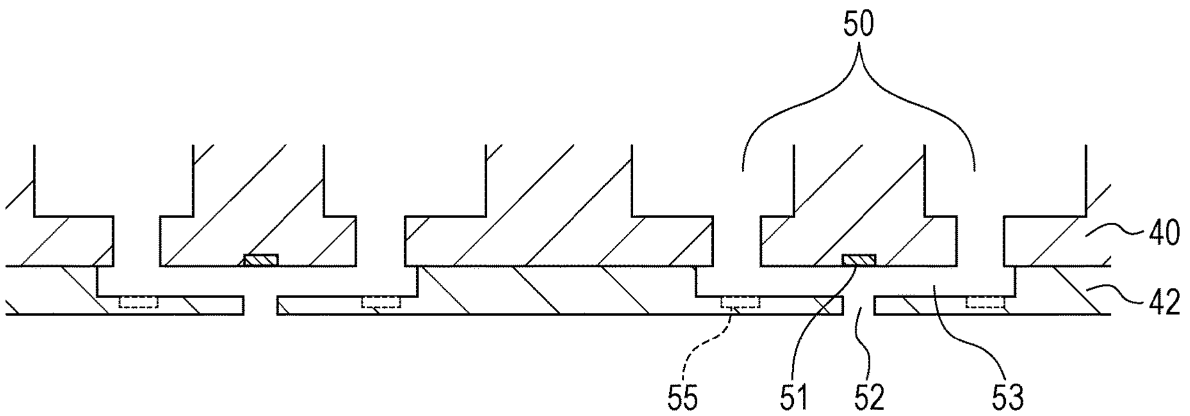
FIG. 13A is a cross-sectional view of a recording element according to a fourth embodiment of the present disclosure.
Figure 13B:
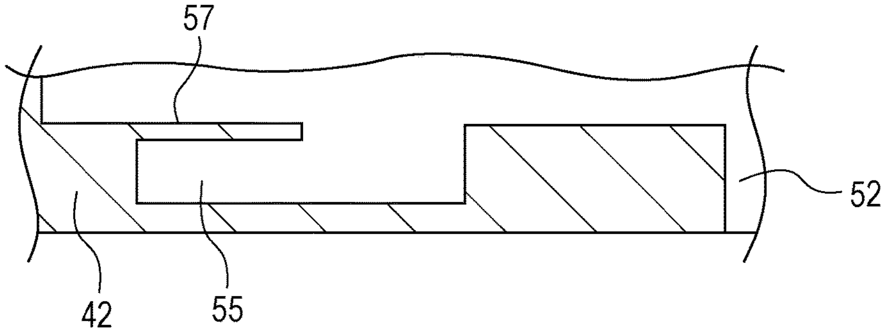
FIG. 13B is a cross-sectional view of the recording element according to the fourth embodiment of the present disclosure.
Figure 13C:
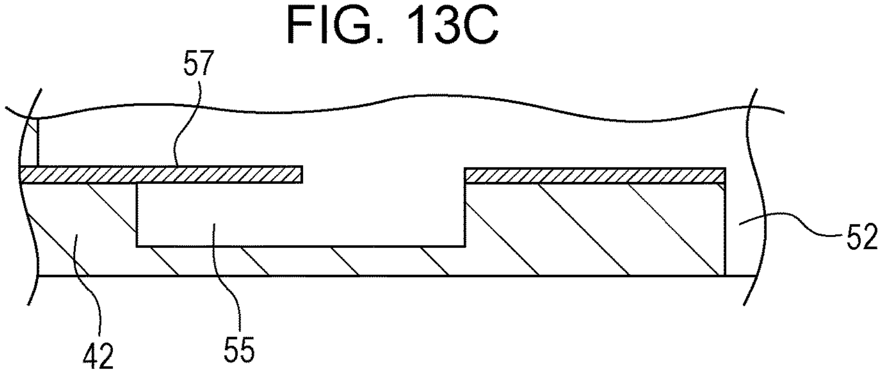
FIG. 13C is a cross-sectional view of the recording element according to the fourth embodiment of the present disclosure.

FIGS. 13A to 13C are schematic diagrams of a fourth embodiment. In this embodiment, two supply paths 50 connect to one discharge port 52 in the recording element 30. FIGS. 13A to 13C are cross-sectional views of the recording element 30 seen from the side. This configuration also provides a high buffer effect by providing the spaces 55 at positions facing the connection 44 between the supply paths 50 and the channels 53. In this case, the covering portion 57 for the space 55 may be formed of the channel formed member 42, as in FIG. 13B, or formed of another layer in the channel formed member 42, as in FIG. 13C.

According to the embodiments of the present disclosure, a liquid discharge head in which meniscus vibration in the discharge ports can be stably reduced or eliminated even in recording at a high ink flow rate per unit time.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-091393, filed Jun. 6, 2022, which is hereby incorporated by reference herein in its entirety.

What is claimed is:

1. A liquid discharge head comprising:

a channel member including a discharge port configured to discharge liquid and at least one channel configured to supply the liquid to the discharge port; and a recording element substrate including a supply path connecting to the at least one channel with a connection, the supply path being configured to supply the liquid to the at least one channel, and an energy generating element configured to discharge the liquid from the discharge port, wherein the channel member further includes, at positions of the channel member facing the connection, a plurality of spaces, the spaces being formed by covering part of recesses of the channel member with a covering portion, the spaces each including an opening communicating with the at least one channel.

2. The liquid discharge head according to claim 1, wherein the spaces extend in a planar direction substantially perpendicular to a liquid discharge direction.

3. The liquid discharge head according to claim 1, wherein the spaces are configured to contain gas.

4. The liquid discharge head according to claim 1, wherein the channel member includes a channel formed member and an adhesion enhancing member between the channel formed member and the recording element substrate and, wherein the spaces are surrounded by the adhesion enhancing member and the channel formed member.

5. The liquid discharge head according to claim 1, wherein the opening is open in a direction opposite to a liquid discharge direction.

6. The liquid discharge head according to claim 1, wherein, in each of the recesses, the partially covered space is provided on one side of the recess.

7. The liquid discharge head according to claim 1, wherein the plurality of spaces is arranged in a row in a longitudinal direction of the channel member.

8. The liquid discharge head according to claim 1, wherein an array in which the plurality of spaces is arranged in a row in a longitudinal direction of the channel member is arrayed in two or more rows in a crosswise direction of the channel member.

9. The liquid discharge head according to claim 1, wherein, of the plurality of spaces arranged in a longitudinal direction of the channel member, wherein in the space located at the far end from a supply port where the liquid is supplied to the channel member, the covering portion is longer in the longitudinal direction than in the space where the distance from the supply port is closer.

10. A liquid discharge apparatus comprising:

a liquid discharge head including:

a channel member including a discharge port configured to discharge liquid and at least one channel configured to supply the liquid to the discharge port; and a recording element substrate including a supply path connecting to the at least one channel with a connection, the supply path being configured to supply the liquid to the at least one channel, and an energy generating element configured to discharge the liquid from the discharge port, wherein the channel member further includes, at positions of the channel member facing the connection, a plurality of spaces, the spaces being formed by covering part of recesses of the channel member with a covering portion, the spaces each including an opening communicating with the at least one channel.

* * * * *